(12) United States Patent
Yoon

(10) Patent No.: US 11,669,565 B2
(45) Date of Patent: Jun. 6, 2023

(54) METHOD AND APPARATUS FOR TRACKING OBJECT

(71) Applicant: SI Analytics Co., Ltd., Daejeon (KR)

(72) Inventor: Kwangjin Yoon, Daejeon (KR)

(73) Assignee: SI Analytics Co., Ltd., Daejeon (KR)

( * ) Notice: Subject to any disclaimer, the term of this patent is extended or adjusted under 35 U.S.C. 154(b) by 0 days.

(21) Appl. No.: 17/672,338

(22) Filed: Feb. 15, 2022

(65) Prior Publication Data

US 2022/0269718 A1 Aug. 25, 2022

(30) Foreign Application Priority Data

Feb. 22, 2021 (KR) .................. 10-2021-0023316

(51) Int. Cl.
| G06F 16/00 | (2019.01) |
| G06F 16/532 | (2019.01) |
| G06F 16/583 | (2019.01) |
| G06F 16/56 | (2019.01) |

(52) U.S. Cl.
CPC .......... G06F 16/532 (2019.01); G06F 16/56 (2019.01); G06F 16/5854 (2019.01)

(58) Field of Classification Search
CPC ..... G06F 16/532; G06F 16/5854; G06F 16/56
See application file for complete search history.

(56) References Cited

U.S. PATENT DOCUMENTS

| 7,158,983 B2 * | 1/2007 | Willse | G06F 40/20 707/999.102 |
| 8,521,662 B2 * | 8/2013 | Chen | G06N 20/00 706/12 |
| 8,559,671 B2 * | 10/2013 | Milanfar | G06V 10/50 382/103 |
| 8,738,547 B2 * | 5/2014 | Chen | G06N 20/00 706/12 |
| 8,935,249 B2 * | 1/2015 | Traub | G06F 16/3331 707/777 |
| 10,217,003 B2 * | 2/2019 | Renkis | G08B 13/19656 |
| 11,062,179 B2 * | 7/2021 | Bose | G06N 3/08 |

(Continued)

FOREIGN PATENT DOCUMENTS

| EP | 3499454 A1 * | 6/2019 |
| JP | 2018026108 A | 2/2018 |

(Continued)

OTHER PUBLICATIONS

Online Multi-Object Tracking with Dual Matching Attention Networks, Zhu et al., Published in MIT, 2019.*

(Continued)

*Primary Examiner* — Daniel A Kuddus
(74) *Attorney, Agent, or Firm* — Ryan Dean; Umberg Zipser LLP

(57) ABSTRACT

Disclosed is a method for tracking an object, which is performed by a computing device including at least one processor, including: obtaining a query set including one or more query samples from a first frame included in an image sequence including two or more image frames; obtaining a detection set including one or more detection samples from a second frame included in the image sequence; and determining a label corresponding to each query sample included in the query set, based on the label of each detection sample included in the detection set.

16 Claims, 7 Drawing Sheets

(56) References Cited

U.S. PATENT DOCUMENTS

| | | | | |
|---|---|---|---|---|
| 11,216,955 | B2* | 1/2022 | Liu | G06V 10/454 |
| 2004/0059736 | A1* | 3/2004 | Willse | G06F 40/20 |
| 2008/0109454 | A1* | 5/2008 | Willse | G06F 16/313 |
| | | | | 707/E17.084 |
| 2012/0278321 | A1* | 11/2012 | Traub | G06F 16/3331 |
| | | | | 707/E17.014 |
| 2018/0114072 | A1* | 4/2018 | Wang | G06V 10/85 |
| 2018/0260414 | A1* | 9/2018 | Gordo Soldevila | G06N 3/084 |
| 2019/0066313 | A1* | 2/2019 | Kim | G06V 10/454 |
| 2019/0133332 | A1* | 5/2019 | Zaiss | A47C 27/14 |
| 2020/0013190 | A1* | 1/2020 | Li | G06T 7/74 |
| 2020/0126241 | A1* | 4/2020 | Wang | G06N 3/048 |
| 2020/0219268 | A1* | 7/2020 | Liu | G06V 10/454 |
| 2020/0394559 | A1* | 12/2020 | Zhang | G06N 3/0472 |
| 2021/0110275 | A1* | 4/2021 | Chen | G06N 3/0454 |
| 2021/0224612 | A1* | 7/2021 | Pinheiro | G06N 3/08 |

FOREIGN PATENT DOCUMENTS

| | | | |
|---|---|---|---|
| JP | 2019133332 | A | 8/2019 |
| KR | 101912569 | B1 | 10/2018 |
| KR | 1020190095200 | A | 8/2019 |
| KR | 102122859 | B1 | 6/2020 |
| KR | 1020200061118 | A | 6/2020 |
| KR | 102152318 | B1 | 9/2020 |
| KR | 102217003 | B1 | 2/2021 |

OTHER PUBLICATIONS

Ji Zhu et al., "Online Multi-Object Tracking with Dual Matching Attention Networks", arXiv:1902.00749v1., Feb. 2, 2019, 17 pages.

* cited by examiner

METHOD AND APPARATUS FOR TRACKING OBJECT

CROSS-REFERENCE TO RELATED APPLICATIONS

This application claims priority to and the benefit of Korean Patent Application No. 10-2021-0023316 filed in the Korean Intellectual Property Office on Feb. 22, 2021, the entire contents of which are incorporated herein by reference.

TECHNICAL FIELD

The present disclosure relates to an artificial intelligence field, and more particularly, to an object tracking technique based on artificial intelligence.

BACKGROUND ART

In recent years, in the art for tracking multiple objects, a tacking-by-detection method has been widely known. A tracking-by-detection technique provides a result of object tracking by a scheme of tracking an object by performing object detection every image frame and associating data of consecutive frames.

However, there is a problem in that it is difficult to apply a conventional tracking-by-detection scheme when the number of objects included in an image is not predetermined.

Korean Patent Registration No. KR2217003 discloses an object tracking method and an apparatus for performing the same.

SUMMARY OF THE INVENTION

The present disclosure is contrived in response to the above-described background art, and has been made in an effort to provide a method for tracking an object in an image sequence by using an artificial neural network.

An exemplary embodiment of the present disclosure provides a method for tracking an object, which is performed by a computing device including at least one processor, which may include: obtaining a query set including one or more query samples from a first frame included in an image sequence including two or more image frames; obtaining a detection set including one or more detection samples from a second frame included in the image sequence; and determining a label corresponding to each query sample included in the query set, based on the label of each detection sample included in the detection set.

In an alternative exemplary embodiment, the determining of the label may include computing a probability distribution of candidate labels to be allocated to the query sample based on a distribution of the respective detection samples included in the detection set in the latent space, and determining the label based on the computed probability distribution.

In an alternative exemplary embodiment, the determining of the label may include calculating a correlation between a query feature vector for the query sample and a detection feature vector for the detection sample, and determining the label based on the calculated correlation.

In an alternative exemplary embodiment, the method may further include: obtaining a first feature vector for a query sample by inputting the query sample into a neural network based feature embedding model; or obtaining a first feature vector for the detection sample by inputting the detection sample into the feature embedding model.

In an alternative exemplary embodiment, the method may further include: obtaining a second feature vector for the detection sample based on a neural network based detection embedding model.

In an alternative exemplary embodiment, the detection embedding model may include at least one bidirectional LSTM cell, and the obtaining of the second feature vector for the detection sample may be performed additionally based on a first feature vector for the detection sample, and an output vector of the bidirectional LSTM cell for at least one detection sample different from the detection sample, and the first feature vector and the second feature vector may be different from each other.

In an alternative exemplary embodiment, the method may further include: obtaining a second feature vector for the query sample based on a neural network based query embedding model.

In an alternative exemplary embodiment, the method may further include: generating input data for the query embedding model based on output data for the query sample of the neural network based feature embedding model and output data for the detection sample of the neural network based detection embedding model.

In an alternative exemplary embodiment, the obtaining of the second feature vector for the query sample may be performed additionally based on a first feature vector for the query sample, and a weighted average vector calculated based on at least one detection sample, and the first feature vector and the second feature vector may be different from each other.

In an alternative exemplary embodiment, the obtaining of the second feature vector for the query sample may include sequentially concatenating the first feature vector for the query sample and the weighted average vector, and inputting the both vectors sequentially concatenated into a fully connected network function included in the query embedding model.

In an alternative exemplary embodiment, the weighted average vector may be calculated as a result of computing a correlation between the first feature vector for the query sample and the second feature vector for at least one detection sample included in the detection set.

In an alternative exemplary embodiment, the method may further include computing detection reliability for each of one or more detection samples included in the detection set.

In an alternative exemplary embodiment, the computing of the detection reliability may be performed based on a neural network based determination model receiving the first feature vector for the detection sample, and then outputting the detection reliability.

In an alternative exemplary embodiment, the method may further include: obtaining the first feature vector for the query sample and the first feature vector for the detection sample based on a neural network based feature embedding model; obtaining the second feature vector for the detection sample based on a neural network based detection embedding model; obtaining the second feature vector for the query sample based on a neural network based query embedding model; and computing the detection reliability for the detection sample based on a neural network based determination model.

In an alternative exemplary embodiment, the determining of the label may be performed based on a similarity calculated between the second feature vector for the query sample and the second feature vector for the detection sample.

Another exemplary embodiment of the present disclosure provides a computer program stored in a computer-readable storage medium. When the computer program is executed by one or more processors, the computer program executes operations of tracking an object, and the operations may include: obtaining a query set including one or more query samples from a first frame included in an image sequence including two or more image frames; obtaining a detection set including one or more detection samples from a second frame included in the image sequence; and determining a label corresponding to each query sample included in the query set, based on the label of each detection sample included in the detection set.

Still another exemplary embodiment of the present disclosure provides an apparatus for tracking an object. The apparatus may include: one or more processors; one or more memories; and a network unit, and the one or more processors may be configured to obtain a query set including one or more query samples from a first frame included in an image sequence including two or more image frames, obtain a detection set including one or more detection samples from a second frame included in the image sequence, and determine a label corresponding to each query sample included in the query set, based on the label of each detection sample included in the detection set.

According to an exemplary embodiment of the present disclosure, an object tracking method can be provided.

DETAILED DESCRIPTION

Figure 1:
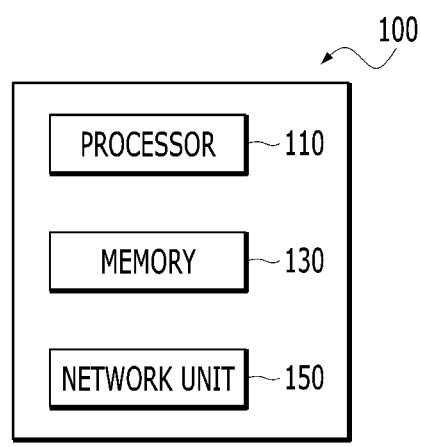
FIG. 1 is a block diagram of a computing device for object tracking according to an exemplary embodiment of the present disclosure.

Various exemplary embodiments will now be described with reference to drawings. In the present specification, various descriptions are presented to provide appreciation of the present disclosure. However, it is apparent that the exemplary embodiments can be executed without the specific description.

"Component", "module", "system", and the like which are terms used in the specification refer to a computer-related entity, hardware, firmware, software, and a combination of the software and the hardware, or execution of the software. For example, the component may be a processing process executed on a processor, the processor, an object, an execution thread, a program, and/or a computer, but is not limited thereto. For example, both an application executed in a computing device and the computing device may be the components. One or more components may reside within the processor and/or a thread of execution. One component may be localized in one computer. One component may be distributed between two or more computers. Further, the components may be executed by various computer-readable media having various data structures, which are stored therein. The components may perform communication through local and/or remote processing according to a signal (for example, data transmitted from another system through a network such as the Internet through data and/or a signal from one component that interacts with other components in a local system and a distribution system) having one or more data packets, for example.

The term "or" is intended to mean not exclusive "or" but inclusive "or". That is, when not separately specified or not clear in terms of a context, a sentence "X uses A or B" is intended to mean one of the natural inclusive substitutions. That is, the sentence "X uses A or B" may be applied to any of the case where X uses A, the case where X uses B, or the case where X uses both A and B. Further, it should be understood that the term "and/or" used in this specification designates and includes all available combinations of one or more items among enumerated related items.

It should be appreciated that the term "comprise" and/or "comprising" means presence of corresponding features and/or components. However, it should be appreciated that the term "comprises" and/or "comprising" means that presence or addition of one or more other features, components, and/or a group thereof is not excluded. Further, when not separately specified or it is not clear in terms of the context that a singular form is indicated, it should be construed that the singular form generally means "one or more" in this specification and the claims.

The term "at least one of A or B" should be interpreted to mean "a case including only A", "a case including only B", and "a case in which A and B are combined".

Those skilled in the art need to recognize that various illustrative logical blocks, configurations, modules, circuits, means, logic, and algorithm steps described in connection with the exemplary embodiments disclosed herein may be additionally implemented as electronic hardware, computer software, or combinations of both sides. To clearly illustrate the interchangeability of hardware and software, various illustrative components, blocks, constitutions, means, logic, modules, circuits, and steps have been described above generally in terms of their functionalities. Whether the functionalities are implemented as the hardware or software depends on a specific application and design restrictions given to an entire system. Skilled artisans may implement the described functionalities in various ways for each particular application. However, such implementation decisions should not be interpreted as causing a departure from the scope of the present disclosure.

The description of the presented exemplary embodiments is provided so that those skilled in the art of the present disclosure use or implement the present disclosure. Various modifications to the exemplary embodiments will be apparent to those skilled in the art. Generic principles defined herein may be applied to other embodiments without departing from the scope of the present disclosure. Therefore, the present disclosure is not limited to the exemplary embodiments presented herein. The present disclosure should be analyzed within the widest range which is coherent with the principles and new features presented herein.

FIG. 1 is a block diagram of a computing device for object tracking according to an exemplary embodiment of the present disclosure. A configuration of the computing device 100 illustrated in FIG. 1 is only an example shown through simplification. In an exemplary embodiment of the present disclosure, the computing device 100 may include other components for performing a computing environment of the computing device 100 and only some of the disclosed components may constitute the computing device 100.

The computing device 100 may include a processor 110, a memory 130, and a network unit 150.

The processor 110 may be constituted by one or more cores and may include processors for data analysis and deep learning, which include a central processing unit (CPU), a general purpose graphics processing unit (GPGPU), a tensor processing unit (TPU), and the like of the computing device. The processor 110 may read a computer program stored in the memory 130 to perform data processing for learning of a neural network based model or inference of the neural network based model according to an exemplary embodiment of the present disclosure.

According to an exemplary embodiment of the present disclosure, the processor 110 may perform an operation for learning the neural network. The processor 110 may perform calculations for learning the neural network, which include processing of input data for learning in deep learning (DL), extracting a feature in the input data, calculating an error, updating a weight of the neural network using backpropagation, and the like. At least one of the CPU, GPGPU, and TPU of the processor 110 may process learning of a neural network. For example, both the CPU and the GPGPU may process the learning of the neural network and data classification using the neural network. Further, in an exemplary embodiment of the present disclosure, processors of a plurality of computing devices may be used together to process the learning of the neural network and the data classification using the neural network. Further, the computer program executed in the computing device according to an exemplary embodiment of the present disclosure may be a CPU, GPGPU, or TPU executable program.

According to an exemplary embodiment of the present disclosure, the memory 130 may store any type of information generated or determined by the processor 110 and any type of information received by the network unit 150. The memory 130 may store at least one parameter included in models based on the neural network. The memory 130 may store at least some of parameter values of the neural network based model received by the network unit 150.

According to an exemplary embodiment of the present disclosure, the memory 130 may include at least one type of storage medium of a flash memory type storage medium, a hard disk type storage medium, a multimedia card micro type storage medium, a card type memory (for example, an SD or XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disk. The computing device 100 may operate in connection with a web storage performing a storing function of the memory 130 on the Internet. The description of the memory is just an example and the present disclosure is not limited thereto.

In the present disclosure, the network unit 150 may use various communication systems regardless a communication aspect such as wired and wireless. The network unit 150 may receive an input image from an external device or an external server by using a communication system such as wired and wireless communication systems. The network unit 150 may receive at least some of the parameter values of a model learned from the external device or the external server by using the communication system such as the wired and wireless communication systems.

In an exemplary embodiment of the present disclosure, the processor 110 may obtain a query set including one or more query samples from a first frame included in an image sequence including two or more image frames. The processor 110 may obtain a detection set including one or more detection samples from a second frame included in the image sequence. The processor 110 may determine a label corresponding to each query sample included in the query set based on a label of each detection sample included in the detection set.

In the present disclosed contents, the image sequence may include a plurality of images or image frames. The image sequence may include a plurality of image frame having a predetermined temporal order. In the present disclosed contents, the terminologies "image frame", "image frame", and "frame" as terminologies which refer to image data corresponding to a specific time in the image sequence may have an equivalent meaning, and may be used interchangeably. The first frame and the second frame included in the image sequence refer to different frames among the plurality of frames included in the image sequence.

In the present disclosed contents, terms "first," "second,", and the like are used to differentiate a certain component from other components, and just used for maintaining consistency of an indication object, but the scope should not be construed to be limited by the terms throughout the specification. Accordingly, as necessary, "first" may be changed to and named as "second" and "second" may be changed to and named as "first" throughout the specification.

In the present disclosed contents, the query sample is data including information on each object when there are one or more different objects in one image frame. For example, when there are i query samples in one image frame, respective query samples may be distinguished through granted numbers such as query sample_1, query sample_2, . . . , query sample_i. In the present disclosed contents, an i-th query sample may be expressed as a symbol $x_g^i$. The query sample may include coordinate data of vertexes of a bounding box including the object. The query sample may include partial image data formed by the bounding box including the object. The partial image data may be image data which exist inside the bounding box. The image data may include an RGB value for each of a plurality of pixels.

In the present disclosed contents, the detection sample is data including information on each object when there are one or more detected objects in one image frame. For example, when there are j detection samples detected in one image frame, the respective detection samples may be distinguished from each other by receiving numbers similarly to the query sample. In the present disclosed contents, a j-th detection sample may be expressed as a symbol $x_g^j$. In the present disclosed contents, a label corresponding to the j-th detection sample may be expressed as $y_g^j$. The label corresponding to the detection sample may be a value for distinguishing one or more detection samples. The label corresponding to the detection sample may be a vector. The label corresponding to the detection sample may be a one-hot vector. For example, where there are two detection samples, a label (i.e., $y_g^1$) corresponding to $x_g^1$ may be [1, 0] and a label (i.e., $y_g^2$) corresponding to $x_g^2$ may be [0, 1]. An example for the label corresponding to the detection sample is just a specific example for description, and the present disclosure includes various methods for distinguishing different detection samples without a limitation.

In an exemplary embodiment of the present disclosure, a detection sample may be data including information on one object detected from the image frame by a detector. The detector may be a separate artificial neural network based detection model. The processor 110 may detect the object for one image frame by using the detector, and obtain data for the detection sample. Learning of the detector may be completed externally, and then the detector may be provided to the computing device 100 through the network unit 150. Further, the computing device 100 may transmit one image frame to an external server, and then also receive data (i.e., information on the detected object) for the detection sample through the network unit 150. Hereinafter, the query sample and the detection sample will be described with reference to FIG. 2 for a more detailed description.

Figure 2:
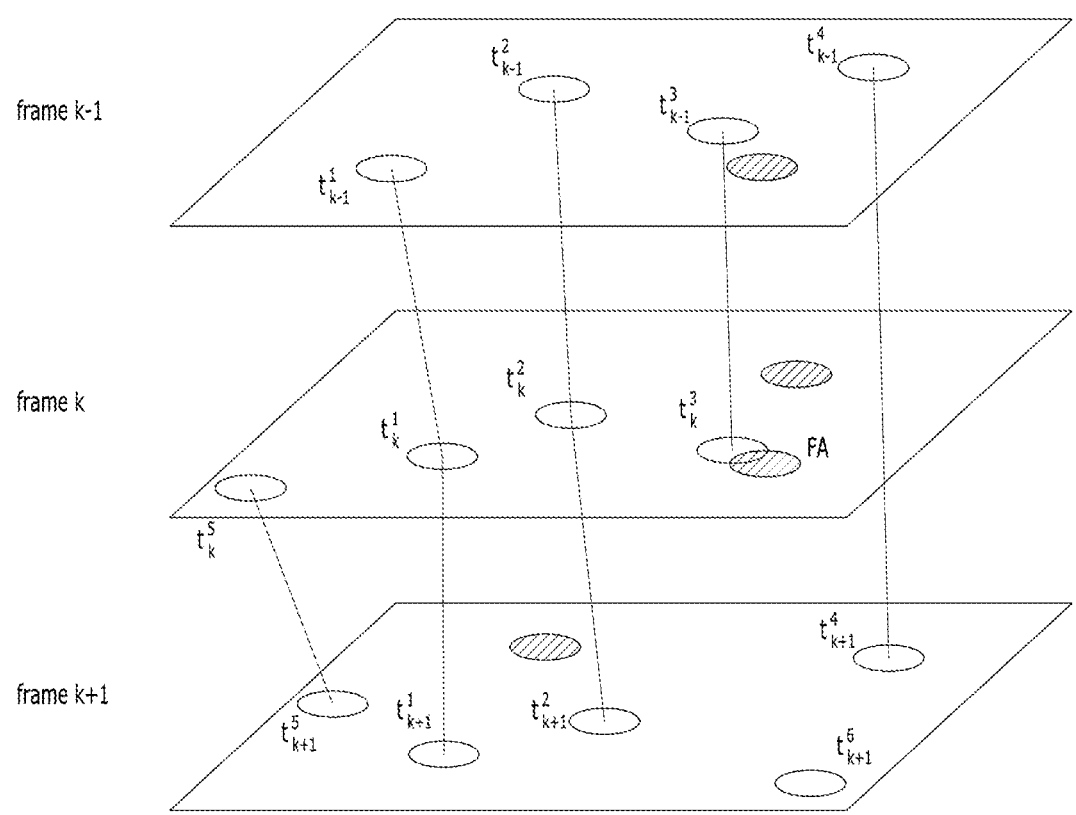
FIG. 2 is a conceptual diagram for describing a method for tracking an object according to an exemplary embodiment of the present disclosure.

FIG. 2 is a conceptual diagram for describing a method for tracking an object according to an exemplary embodiment of the present disclosure. FIG. 2 exemplarily illustrates three frames included in the image sequence for description. In FIG. 2, $t_B^A$ may be an express for representing each one corresponding query sample from the viewpoint of a track set. In $t_B^A$, A represents a number of the track set being tracked and B represents a number of the frame. In the present disclosure, the track set is a set of data determined as the same object by the processor 110 through a plurality frames. The track set may be information for representing a trajectory of the data being tracked by the processor 110, and include detection samples pre-detected through the plurality of frames.

The query set is a set of data including one or more query samples which exist for each frame. For example, a query set included in frame k−1 may be expressed as $\{t_{k-1}^1, t_{k-1}^2, t_{k-1}^3, t_{k-1}^4\}$ from the viewpoint of the track set, a query set included in frame k may be expressed as $\{t_k^1, t_k^2, t_k^3, t_k^5\}$ from the viewpoint of the track set, and a query set included in frame k+1 may be expressed as $\{t_{k+1}^1, t_{k+1}^2, t_{k+1}^4, t_{k+1}^5, t_{k+1}^6\}$ from the viewpoint of the track set. The viewpoint of the track set refers to expressing one same query sample as a form of $t_B^A$ other than a symbol (e.g., $x_a^i$) for the query sample.

The track set may exist throughout the plurality of frames, and for example, track set #1 may be expressed as $\{t_{k-1}^1, t_k^1, t_{k+1}^1\}$, and it can be seen that three track sets are all tracked throughout three frames illustrated in FIG. 2. As another example, track set #3 is expressed as $\{t_{k-1}^3, t_k^3\}$ and is not tracked in frame k+1. As still another example, track set #4 may be expressed as $\{t_{k-1}^4, t_{k+1}^4\}$, and is not tracked in a k-th frame and tracked again in a k+1-th frame.

When one track set exists throughout the plurality of frames, partial data of a track set which exists in one frame among the plurality of frames may be a query sample in one corresponding frame. That is, from the viewpoint of one frame, the set of the query samples may be referred to as the query set and the set of the query samples throughout the plurality of frames may be referred to as the track set.

False alarm (FA) of FIG. 2 represents a wrongly detected result among detection samples detected by a detector for each frame. For example the FA may be determined when detection reliability of the detector for the image frame is lower than a predetermined threshold.

In an exemplary embodiment of the present disclosure, when the computing device 100 receives a new frame (i.e., frame k+2), the processor 110 may perform a matching task of each of the detection samples included in the detection result for a new frame with one of the query samples included in at least one frame (i.e., frame k−1 to frame k+1). The processor 110 may perform a matching task for determining the label corresponding to each query sample included in the query set based on the label of at least one detection sample included in the detection set obtained from the new frame. The processor 110 may consecutively track the same object by connecting a detection sample detected in a newly received image frame to a query sample of a conventional frame. The example of the object tracking by FIG. 2 described above is just an exemplary embodiment for description, but does not limit the present disclosure.

Figure 3:
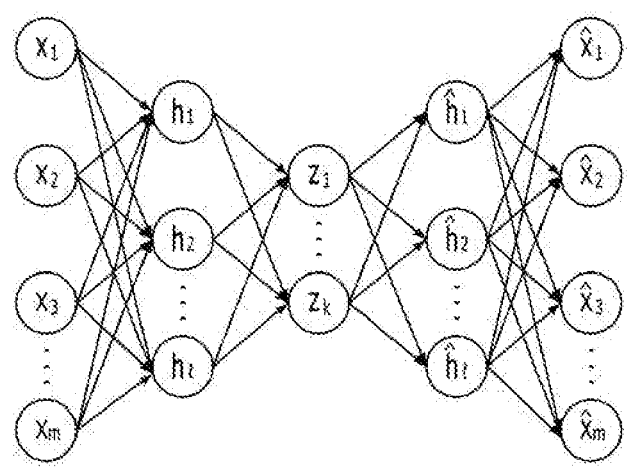
FIG. 3 is a schematic diagram illustrating a network function according to an exemplary embodiment of the present disclosure.

FIG. 3 is a schematic diagram illustrating a network function according to an exemplary embodiment of the present disclosure.

Throughout the present specification, terminologies "neural network based X model", "neural network based Y model", etc., may be used for calling a computation model that performs a computation for input data by at least some of nodes included in the neural network and generates result output data thereof. The terminologies "neural network based X model", "neural network based Y model", etc., may be used for distinguishing a minimum unit for a series of computation operations using the neural network. Throughout the present specification, the "neural network based X model" and the "neural network based Y model" may be briefly interchangeably used as "X model" and "Y model", respectively.

Throughout the present specification, terminologies 'neural network', 'artificial neural network', 'network function', and 'neural network' may be interchangeably used. The neural network may be generally constituted by an aggregate of calculation units which are mutually connected to each other, which may be called nodes. The nodes may also be called neurons. The neural network is configured to include one or more nodes. The nodes (alternatively, neurons) constituting the neural networks may be connected to each other by one or more links.

In the neural network one or more nodes connected through the link may relatively form the relationship between an input node and an output node. Concepts of the input node and the output node are relative and a predetermined node which has the output node relationship with respect to one node may have the input node relationship in the relationship with another node and vice versa. As described above, the relationship of the input node to the output node may be generated based on the link. One or more output nodes may be connected to one input node through the link and vice versa.

In the relationship of the input node and the output node connected through one link, a value of data of the output node may be determined based on data input in the input node. Here, a link connecting the input node and the output node to each other may have a weight. The weight may be variable and the weight is variable by a user or an algorithm in order for the neural network to perform a desired function. For example, when one or more input nodes are mutually connected to one output node by the respective links, the output node may determine an output node value based on values input in the input nodes connected with the output node and the weights set in the links corresponding to the respective input nodes.

As described above, in the neural network, one or more nodes are connected to each other through one or more links to form a relationship of the input node and output node in the neural network. A characteristic of the neural network may be determined according to the number of nodes, the number of links, correlations between the nodes and the links, and values of the weights granted to the respective links in the neural network. For example, when the same number of nodes and links exist and there are two neural networks in which the weight values of the links are different from each other, it may be recognized that two neural networks are different from each other.

The neural network may be constituted by a set of one or more nodes. A subset of the nodes constituting the neural network may constitute a layer. Some of the nodes constituting the neural network may constitute one layer based on the distances from the initial input node. For example, a set of nodes of which distance from the initial input node is n may constitute n layers. The distance from the initial input node may be defined by the minimum number of links which should be passed through for reaching the corresponding node from the initial input node. However, definition of the layer is predetermined for description and the order of the layer in the neural network may be defined by a method different from the aforementioned method. For example, the layers of the nodes may be defined by the distance from a final output node.

The initial input node may mean one or more nodes in which data is directly input without passing through the links in the relationships with other nodes among the nodes in the neural network. Alternatively, in the neural network, in the relationship between the nodes based on the link, the initial input node may mean nodes which do not have other input nodes connected through the links. Similarly thereto, the final output node may mean one or more nodes which do not have the output node in the relationship with other nodes among the nodes in the neural network. Further, a hidden node may mean nodes constituting the neural network other than the initial input node and the final output node.

In the neural network according to an exemplary embodiment of the present disclosure, the number of nodes of the input layer may be the same as the number of nodes of the output layer, and the neural network may be a neural network of a type in which the number of nodes decreases and then, increases again from the input layer to the hidden layer. Further, in the neural network according to another exemplary embodiment of the present disclosure, the number of nodes of the input layer may be smaller than the number of nodes of the output layer, and the neural network may be a neural network of a type in which the number of nodes decreases from the input layer to the hidden layer. Further, in the neural network according to still another exemplary embodiment of the present disclosure, the number of nodes of the input layer may be larger than the number of nodes of the output layer, and the neural network may be a neural network of a type in which the number of nodes increases from the input layer to the hidden layer. The neural network according to yet another exemplary embodiment of the present disclosure may be a neural network of a type in which the neural networks are combined.

The neural network according to an exemplary embodiment of the present disclosure may include a plurality of neural network layers. The plurality of neural network layers may constitute a sequence having a predetermined order according to a function and a role in the neural network. The plurality of neural network layers may include a convolutional layer, a pooling layer, a fully connected layer, etc. An initial input for the neural network may be received by a lowest initial layer in the sequence. The neural network may sequentially input the initial input into the layers in the sequence in order to create a final output from the initial input. The initial input may be, for example, an image, and a final output therefor may be, for example, a score for each category in a category set including one or more categories.

According to the exemplary embodiment of the present disclosure, the neural network layer may include at least one node. A weight or a bias may be allocated to each node included in the neural network layer. The memory 130 of the computing device 100 according to the present disclosure may store the weight or the bias allocated to at least one node included in the neural network layer. Each neural network layer may receive the initial input for the convolutional neural network or an output of a previous neural network layer as an input. For example, in the sequence constituted by the plurality of neural network layers, an N-th neural network layer may receive an output of an N−1-th neural network layer as the input. Each neural network layer may create the output from the input. When the neural network layer is a highest final neural network layer in the sequence, the output of the neural network layer may be treated as an output of an entire neural network.

In the present disclosure, a term called a "feature map" may be used as a term referring at least a part of a result value of a convolutional operation. The neural network layer may include one or more filters for the convolutional operation. The feature map may be used as a term that refers a result of performing the convolutional operation by using one of one or more filters included in the neural network layer. A size of an output dimension of the neural network layer may be equal to the number of filters included in the neural network layer.

A deep neural network (DNN) may refer to a neural network that includes a plurality of hidden layers in addition to the input and output layers. When the deep neural network is used, the latent structures of data may be determined. That is, latent structures of photos, text, video, voice, and music (e.g., what objects are in the photo, what the content and feelings of the text are, what the content and feelings of the voice are) may be determined. The deep neural network may include a convolutional neural network (CNN), a recurrent neural network (RNN), an auto encoder, generative adversarial networks (GAN), a restricted Boltzmann machine (RBM), a deep belief network (DBN), a Q network, a U network, a Siam network, a Generative Adversarial Network (GAN), and the like. The description of the deep neural network described above is just an example and the present disclosure is not limited thereto.

In an exemplary embodiment of the present disclosure, the network function may include the auto encoder. The auto encoder may be a kind of artificial neural network for outputting output data similar to input data. The auto encoder may include at least one hidden layer and odd hidden layers may be disposed between the input and output layers. The number of nodes in each layer may be reduced from the number of nodes in the input layer to an intermediate layer called a bottleneck layer (encoding), and then expanded symmetrical to reduction to the output layer (symmetrical to the input layer) in the bottleneck layer. The auto encoder may perform non-linear dimensional reduction. The number of input and output layers may correspond to a dimension after preprocessing the input data. The auto encoder structure may have a structure in which the number of nodes in the hidden layer included in the encoder decreases as a distance from the input layer increases. When the number of nodes in the bottleneck layer (a layer having a smallest number of nodes positioned between an encoder and a decoder) is too small, a sufficient amount of information may not be delivered, and as a result, the number of nodes in the bottleneck layer may be maintained to be a specific number or more (e.g., half of the input layers or more).

The neural network may be learned in at least one scheme of supervised learning, unsupervised learning, semi supervised learning, or reinforcement learning. The learning of the neural network may be a process in which the neural network applies knowledge for performing a specific operation to the neural network.

The neural network may be learned in a direction to minimize errors of an output. The learning of the neural network is a process of repeatedly inputting learning data into the neural network and calculating the output of the neural network for the learning data and the error of a target and back-propagating the errors of the neural network from the output layer of the neural network toward the input layer in a direction to reduce the errors to update the weight of each node of the neural network. In the case of the supervised learning, the learning data labeled with a correct answer is used for each learning data (i.e., the labeled learning data) and in the case of the unsupervised learning, the correct answer may not be labeled in each learning data. That is, for example, the learning data in the case of the supervised learning related to the data classification may be data in which category is labeled in each learning data. The labeled learning data is input to the neural network, and the error may be calculated by comparing the output of the neural network with the label of the learning data. In the present disclosure, the neural network based models compare a prediction label for the query sample with a correct answer label for learning for the query sample to calculate an error for example. As another example, in the case of the unsupervised learning related to the data classification, the learning data as the input is compared with the output of the neural network to calculate the error. The calculated error is back-propagated in a reverse direction (i.e., a direction from the output layer toward the input layer) in the neural network and connection weights of respective nodes of each layer of the neural network may be updated according to the back propagation. A variation amount of the updated connection weight of each node may be determined according to a learning rate. Calculation of the neural network for the input data and the back-propagation of the error may constitute a learning cycle (epoch). The learning rate may be applied differently according to the number of repetition times of the learning cycle of the neural network. For example, in an initial stage of the learning of the neural network, the neural network ensures a certain level of performance quickly by using a high learning rate, thereby increasing efficiency and uses a low learning rate in a latter stage of the learning, thereby increasing accuracy.

In learning of the neural network, the learning data may be generally a subset of actual data (i.e., data to be processed using the learned neural network), and as a result, there may be a learning cycle in which errors for the learning data decrease, but the errors for the actual data increase. Overfitting is a phenomenon in which the errors for the actual data increase due to excessive learning of the learning data. For example, a phenomenon in which the neural network that learns a cat by showing a yellow cat sees a cat other than the yellow cat and does not recognize the corresponding cat as the cat may be a kind of overfitting. The overfitting may act as a cause which increases the error of the machine learning algorithm. Various optimization methods may be used in order to prevent the overfitting. In order to prevent the overfitting, a method such as increasing the learning data, regularization, dropout of omitting a part of the node of the network in the process of learning, utilization of a batch normalization layer, etc., may be applied.

According to an exemplary embodiment of the present disclosure, the processor 110 inputs a query sample into a neural network based feature embedding model to obtain a first feature vector for the query sample. The feature embedding model may be a model for primarily mapping image data to a latent space. The feature embedding model may be a model for receiving the image data included in the sample and expressing the received image data as the vector on the latent space. For example, the feature embedding model may generate a vector form output through a computation by at least one node included in the neural network by inputting an image patch having a size of N×M. The processor 110 may obtain a first feature vector for the detection sample by inputting the detection sample into the feature embedding model. The query sample and the detection sample may share one feature embedding model in order to obtain the first feature vector for each thereof. The query sample and the detection sample may use different feature embedding models, respectively.

A detection embedding model according to the present disclosure may receive the first feature vector for the detection sample and output a second feature vector for the detection sample. In the present disclosed contents, the first feature vector for the detection sample and the second feature vector for the detection sample may be vectors generated based on different models. For example, the first feature vector for the detection sample may be a latent vector output as a result of inputting the detection sample into the feature embedding model by the processor 110. In this case, the second feature vector may be a latent vector output as a result of inputting the first feature vector which is previously generated into the detection embedding model by the processor 110. The second feature vector may be a latent vector acquired by reflecting additional information to the first feature vector. The additional information may include, for example, information for distribution correction of a vector value, information to which relevance to other input data is reflected, statistical value information for all data, etc.

The processor 110 may generate the second feature vector for each detection sample by considering a relationship between one detection sample included in a given detection set and the remaining detection samples through the detection embedding model. In an exemplary embodiment of the present disclosure, the detection embedding model for considering the relationship between one detection sample and the remaining detection samples may include at least one bidirectional long short-term memory (LSTM) cell. The bidirectional LSTM cell is a minimum unit of an LSTM layer. The bidirectional LSTM cell included in the bidirectional LSTM layer may exist as large as the number of data input once. The bidirectional LSTM layer is an artificial neural network structure that outputs the latent vector considering both forward information and reverse information in data having an order. The processor 110 according to the present disclosure may grant a series of orders to the detection samples to input the detection samples having the order into the bidirectional LSTM layer. Since the bidirectional LSTM layer generates the latent vector by reflecting not unidirectional information but bidirectional information, the bidirectional LSTM layer has a feature of being capable of generating a vector to which all peripheral data are reflected. Accordingly, the processor 110 reflects relevance between one detection sample and the remaining detection samples through the detection embedding, model according to the present disclosure to generate a second feature vector for the one detection sample. A specific additional description for the LSTM layer will be more specifically discussed in a prior thesis "S., Hochreiter, J. Schmidhuber, 'Long short-term memory', Neural Comput. vol. 9, no. 8, pp. 1735-1780, 1997", the entire contents of which are incorporated herein by reference.

The processor 110 may obtain the second feature vector for one detection sample based on the first feature vector for one detection sample and an output vector of the bidirectional LSTM cell for at least one detection sample different from the one detection sample. In other words, the processor 110 may obtain the second feature vector for detection sample A based on the first feature vector for detection sample A and an output vector of the bidirectional LSTM cell for detection sample B. In this case, detection sample A and detection sample B are different detection samples. Likewise, the method according to the present disclosure has an effect of being capable of generating a feature vector to which a relative location is reflected in an entire detection set because other detection samples (e.g., detection sample B, detection sample C, etc.) included in the same detection set are considered in generating the second feature vector for detection sample A.

The detection embedding model according to the present disclosure may generate the second feature vector for the detection sample through computations such as Equation 1 to 3.

$$g_j = \vec{h}_j + \overset{\leftarrow}{h}_j + f(x_g^{(j)})$$ [Equation 1]

$x_g^{(j)}$ represents a j-th detection sample. $f(x_g^{(j)})$ represents the first feature vector for the j-th detection sample obtained as a result of inputting $x_g^{(j)}$ (i.e., j-th detection sample) into the feature embedding vector by the processor 110. $g_j$ represents the second feature vector of the j-th detection sample included in the detection set. $\vec{h}_i$ and $\overset{\leftarrow}{h}_i$ represent the output vectors by the LSTM cell, and may be computed through Equation 2 and Equation 3, respectively.

$$\vec{h}_j, \vec{c}_j = \text{LSTM}(f(x_g^{(j)}), \vec{h}_{j-1}, \vec{c}_{j-1})$$ [Equation 2]

$$\overset{\leftarrow}{h}_j, \overset{\leftarrow}{c}_j = \text{LSTM}(f(x_g^{(j)}), \overset{\leftarrow}{h}_{j+1}, \overset{\leftarrow}{c}_{j+1})$$ [Equation 3]

In Equations 2 and 3, LSTM(.) represents a computation result by the bidirectional LSTM cell. $\vec{h}$ and $\overset{\leftarrow}{h}$ represent forward and reverse hidden state vectors, respectively. $\vec{c}$ and $\overset{\leftarrow}{c}$ represent forward and reverse cell state (hidden state) vectors, respectively. In Equations 2 and 3, a subscript j represents a calculation result for the j-th detection sample.

Through the present disclosure, the processor 110 may primarily obtain the second feature vector for the detection sample considering a mutual relationship among a plurality of detection samples from the first feature vector for the detection sample independently mapped on the latent space. The processor 110 may obtain the second feature vector for the detection sample based on the detection embedding model.

In an exemplary embodiment of the present disclosure, the processor 110 may obtain the second feature vector for the query sample based on the neural network based query embedding model. The first feature vector for the query sample and the second feature vector for the query sample may be vectors generated based on different models. The second feature vector for the query sample may be a latent vector generated based on the first feature vector for the query sample. The second feature vector for the query sample may be a latent vector output as a result of inputting the first feature vector for the query sample which is previously generated into the query embedding model by the processor 110. The second feature vector for the query sample may be a latent vector acquired by reflecting additional information to the first feature vector for the query sample. The additional information may include, for example, information for distribution correction of a vector value, information to which relevance to other input data is reflected, statistical value information for all data, etc. The second feature vector for the query sample and the second feature vector for the detection sample may be vectors generated based on different neural network based embedding models.

The query embedding model according to the present disclosure acquires the second feature vector for the query sample based on the first feature vector for the query sample, but additionally based on relevance between the query sample and the detection samples. The processor 110 may use the second feature vector for the detection sample in order to calculate the relevance between the query sample and the detection samples.

The processor 110 may generate input data for the query embedding model based on the output data for the query sample of the neural network based feature embedding model and the output data for the detection sample of the neural network based detection embedding model. The output data for the query sample of the feature embedding model may be the first feature vector for the query sample. The output data for the detection sample of the detection embedding model may be the second feature vector for the detection sample. According to the present disclosure, the processor 110 may consider the relationship between the query sample and the plurality of detection samples in generating the second feature vector for the query sample through a structure of the neural network based model having input and output paths.

The processor 110 may obtain the second feature vector for the query sample based on a weighted average vector calculated based on the first feature vector for the query sample and at least one detection sample through the query embedding model.

Hereinafter, a calculation method of the weighted average vector calculated based on at least one detection sample will be described. In an exemplary embodiment of the present disclosure, the weighted average vector calculated based on at least one detection sample may be calculated as a result of calculating a correlation between the 'first feature vector for the query sample' and the 'second feature vector for at least one detection sample' included in the detection set, by the processor 110. As an example, the processor 110 may compute a similarity or a distance between the 'first feature vector for the query sample' and the 'second feature vector for the detection sample' in order to calculate the correlation between both vectors. A specific calculation method of the similarity or distance may include, for example, a Euclidian distance, a Manhattan distance, a Cosine distance, etc. The processor 110 may perform an inner product between the 'first feature vector for the query sample' and the 'second feature vector for the detection sample' in order to calculate the correlation between both vectors. The processor 110 may calculate the 'weighted average vector' by using a weight which is in proportion to the calculated correlation value between both vectors. Specifically, in calculating a correlation between a first feature vector for an i-th query sample and the detection set, by a scheme of giving a high weight to the label corresponding to the detection sample as the correlation between the first feature vector for the i-th query sample and the second feature vector for the detection sample is stronger and giving a low weight to the label corresponding to the detection sample as the correlation between the first feature vector for the i-th query sample and the second feature vector for the detection sample is weaker, the 'weighted average vector' may be calculated. Hereinafter, the method for computing the weighted average vector according to the present disclosure will be additionally described with reference to Equations 4 and 5.

$$r_i = \sum_{j=1}^{|G|} a_{ij} g_j \qquad \text{[Equation 4]}$$

$r_i$ represents a weighted average vector for the i-th query sample. $a_{ij}$ may represent a value of a j-th element of vector $a_i$ and the vector $a_i$ may be calculated through Equation 5 below. $g_j$ represents the second feature vector of the j-th detection sample. In Equation 4, j may have a natural number of 1 to |G|, and |Gβ represents a size of the detection set (i.e., the total number of detection samples).

As in Equation 4, the processor 110 may multiply the second feature vector of the detection sample by an appropriate weight (i.e., $a_{ij}$), and then aggregate all second feature vectors of the detection sample to calculate the weighted average vector.

$$a_i = \text{softmax}\left(\sum_{j=1}^{|G|} \langle f(x_q^{(i)}), g_j \rangle y_g^{(j)}\right) \qquad \text{[Equation 5]}$$

f(.) represents a function expression corresponding to the feature embedding model, and $f(x_q^{(i)})$ represents the first feature vector for the i-th query sample acquired by inputting $x_\sigma^{(i)}$ (i.e., the i-th query sample) into the feature embedding model. $g_i$ represents the second feature vector of the j-th detection sample. <A, B> represents the inner product between A and B. $y_g^{(j)} y_g^{(j)}$ represents the label corresponding to a j-th detection sample. |G| represents a size of the detection set. softmax( ) represents a softmax function for representing a probability distribution. $a_i$ positioned at a left side of Equation 5 represents a probability distribution vector calculated by the softmax function in relation to the i-th query sample.

When Equations 4 and 5 according to the present disclosure are aggregated and described, the processor 110 first derives the correlation by inner product of the first feature vector of the i-th query sample and the second feature vector for each detection sample included in the detection set. It may be appreciated that as an inner product value between both vectors is larger in a positive direction, the correlation between both vectors is large and the similarity between both vectors is high, and on the contrary, as the inner product value is larger in a negative direction, the correlation between both vectors is low and the similarity between both vectors is low. The processor 110 may obtain the probability distribution vector by taking the softmax function by multiplying a correlation index according to the inner product by the label corresponding to each detection sample. Thereafter, the processor 110 according to the present disclosure may aggregate second feature vectors for all detection samples by weighting the second feature vector for the j-th detection sample as large as the size of the j-th element of the probability distribution vector. As a result, the processor 110 may calculate the 'weighted average vector' according to the present disclosure.

When the processor 110 according to the present disclosure generates the 'weighted average vector' by reflecting the 'first feature vector for the query sample', the processor 110 may give a weight, to the 'first feature vector for the query sample' and the 'second feature vectors' for a plurality of detection samples according to the distance on the latent space to generate the 'weighted average vector considering the relationship between the query sample and the detection samples'. In the object tracking method according to the present disclosure, more accurate label matching is possible than conventional methods in that the 'weighted average vector' corrects the 'first feature vector for the query sample' when following the method according to the present disclosure in that the 'label corresponding to the detection sample' is given to the 'query sample'.

Hereinafter, a method for calculating 'the second feature vector for the query sample' according to the present disclosure will be described. The processor 110 may generate 'the second feature vector for the query sample' by reflecting 'the weighted average vector' to 'the first feature vector for the query sample'.

In an exemplary embodiment of the present disclosure, the processor 110 sequentially connects the first feature vector for the query sample and the weighted average vector calculated based on at least one detection sample, and then inputs both sequentially connected vectors into a fully connected network function included in the query embedding model to obtain the second feature vector for the query sample. The query embedding model may generate an output vector having the same size as the output vector by the feature embedding model. The first feature vector for the query sample and the second feature vector for the query sample may have the same size. The fully connected network function included in the query embedding model may be an artificial neural network model including connection weights which are as large as a combinationable maximum number of an input node, an intermediate node, and an output node. The fully connected network function included in the query embedding model may include at least one fully connected layer. For example, when the number of input nodes of the fully connected network function is 16, the number of output nodes is 8, and the fully connected network function is constituted only by an input layer and an output layer, the fully connected network function may include 128 (=16×8) connection weights. The processor 110 sequentially concatenates the first feature vector for the query sample and the weighted average vector, and computes the concatenated vectors through the fully connected network function to calculate 'the second feature vector for the query sample' acquired by reflecting information indicated by 'the weighted average vector' to value of 'the first feature vector for the query sample'.

As described above, according to the present disclosure, 'the first feature vector for the query sample' may be used when 'the weighted average vector' and also used when 'the second feature vector for the query sample'. The processor 110 may use 'the first feature vector for the query sample' in order to generate 'the weighted average vector' considering a correlation between 'the first feature vector for the query sample' and at least one detection sample included in the detection set. The processor 110 may use 'the first feature vector for the query sample' in order to generate 'the second feature vector for the query sample' as a result of adjusting a value of 'the first feature vector for the query sample' through 'the weighted average vector'.

According to the present disclosure, since the processor 110 maps the query sample to the latent space again by considering the correlation between the query sample and the detection set in calculating 'the second feature vector for the query sample', there is an effect that classification performance is enhanced upon finally determining the label of the query sample. In particular, in a situation in which the query samples are positioned close to each other or the detection samples are positioned close to each other in the image frame, when the method according to the present disclosure is used, classification accuracy is enhanced as compared with granting the labels to the query samples by using only the first feature vector of the query sample. The method for determining the labels corresponding to the query samples, respectively by the processor 110 will be described below in detail.

In an exemplary embodiment according to the present disclosure, the processor 110 may compute detection reliability for each of one or more detection samples included in the detection set. The processor 110 compares the detection reliability for each detection sample and a predetermined threshold to remove a detection sample having lower detection reliability than the predetermine threshold from the detection set. The computing device 100 according to the present disclosure may obtain the detection sample included in the image frame as a detection result using a separate detector. The computing device 100 may also receive data for the detection sample included in the image frame from an external server performing a detection function. In this case, the detection sample obtained as the detection result may include a false positive (FP) detection result with a predetermined probability. The false positive (FP) detection result may occur when a part other than an object is detected as the object in the image frame. When matching the query sample is performed for the detection set including the FP detection result, wrong object tracking may be made. Accordingly, the object tracking method according to the present disclosure has an effect of filtering so that the detection set may include only an accurate detection result by comparing the detection reliability and the predetermined threshold.

In an exemplary embodiment of the present disclosure, an operation of computing the detection reliability of the detection sample included in the detection set by the processor 110 may be performed based on the neural network based determination model. The neural network based determination model may output the detection reliability after receiving the first feature vector for the detection sample. The neural network based determination model may include at least a part of the fully connected network function. The processor 110 may input a vector expression for the image data into the determination model, and then obtain a classification result expressed as a scalar value. The obtained classification result may be a value representing the detection reliability for the detection result.

The neural network based determination model according to the present disclosure is learned to receive the first feature vector for the detection sample and output the detection reliability without examining false or positive by inputting a detection sample which is a result detected by another detector, i.e., image data as it is to enjoy an effect in that the feature embedding model generating the first feature vector for the detection sample is also learned in the process of learning the neural network based determination model. When the processor 110 outputs the detection reliability by inputting the first feature vector of the detection sample into the determination model, the processor 110 may verify whether the detection sample detected from the image frame is true or false, and the processor 110 may also learn the feature embedding model so as to generate a vector distant on the latent space for each of a detection sample in which the feature embedding model is mis-detected and a detection sample in which the feature embedding model is normally detected in the process of learning the determination model. This reduces noise to enhance accuracy of mapping of the latent space to the image data. Hereinafter operations of each neural network based model according to the present disclosure will be described with reference to FIG. 4.

Figure 4:
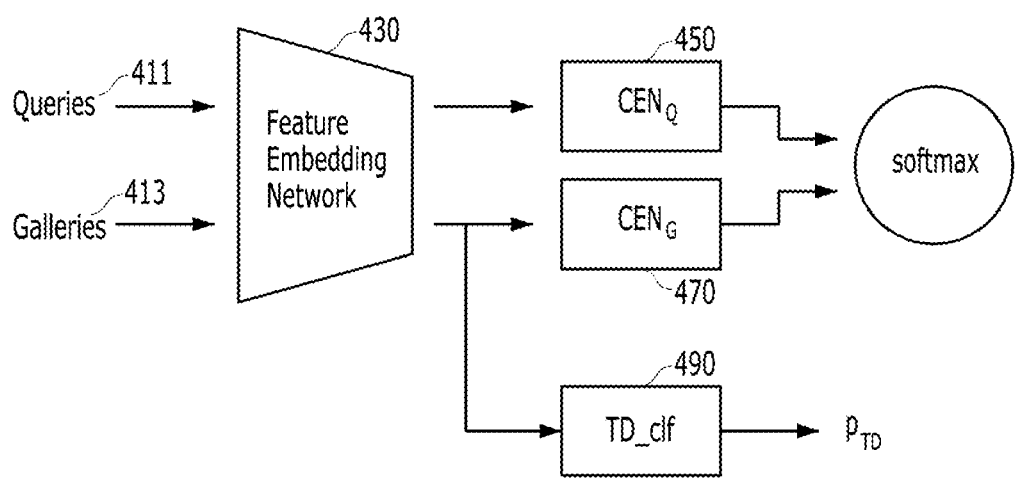
FIG. 4 is a conceptual diagram for a process of processing image sequence data through a plurality of neural network based models according to an exemplary embodiment of the present disclosure.

FIG. 4 is a conceptual diagram for a process of processing image sequence data through a plurality of neural network based models according to an exemplary embodiment of the present disclosure. The processor 110 may obtain a first feature vector for each of query samples 411 by inputting and computing the query samples 411 into a feature embedding model 430. The query samples 411 may be data included in a first frame included in an image sequence. The processor 110 may obtain a first feature vector for each of detection samples 413 by inputting and computing the detection samples 413 into the feature embedding model 430. The detection samples 413 may be data included in a second frame included in the image sequence. The processor 110 may calculate detection reliability of the detection sample by inputting and computing the first feature vector for the detection sample into a neural network based determination model 490. The processor 110 compares the calculated detection reliability and a predetermined threshold to determine whether a FP detection result of the detection sample. When determining that the detection sample as the FP detection result as a result of the determination, the processor 110 may remove the corresponding detection sample from the detection set. The processor 110 may obtain a second feature vector for the detection sample by inputting and computing the first feature vector for the detection sample into a detection embedding model 470. The detection embedding model 470 may include at least one bidirectional LSTM cell, and calculate a second feature vector for one detection sample by considering a relationship with other detection samples included in the detection set. The processor 110 may obtain a second feature vector for a query sample by inputting and computing a first feature vector for the query sample and the second feature vector for the detection sample into a query embedding model 450. The query embedding model 450 may calculate the second feature vector for the query sample mapping the query sample to the latent space by considering a relationship between the query sample and detection samples. The processor 110 may determine a label corresponding to the query sample based on a correlation between the second feature vector for the query sample and the second feature vector for the detection sample.

Hereinafter, the method for determining the labels corresponding to the query samples, respectively by the processor 110 will be described in detail.

According to an exemplary embodiment of the present disclosure, the processor 110 may determine a label corresponding to each query sample included in the query set based on a label of each detection sample included in the detection set. Specifically, the processor 110 may calculate a correlation between a query feature vector for the query sample and a detection feature vector for the detection sample, and determine the label for the query sample based on the calculated correlation. The query feature vector may include a first feature vector for the query sample and a second feature vector for the query sample. The detection feature vector may include a first feature vector for the detection sample and a second feature vector for the detection sample.

As described above, the processor 110 may calculate the second feature vector for the query sample based on a correlation between the first feature vector for the query sample and the second feature vector for the detection sample. Further, the processor 110 may determine a label for the query sample based on a correlation between the second feature vector for the query sample and the second feature vector for the detection sample which are calculated. A method for determining the label corresponding to the query sample based on the correlation between 'the second feature vector for the query sample' and 'the second feature vector for the detection sample' by the processor 110 according to the present disclosure will be described below with reference to Equation 6.

According to an exemplary embodiment of the present disclosure, the processor 110 may compute a probability distribution of candidate labels to be allocated to the query sample based on a distribution in the latent space of each detection sample included in the detection set, and determine the label to be allocated to the query sample based on the computed probability distribution. A distribution of each detection sample included in the detection set in the latent space may be implemented as the second feature vector of the detection sample. For example, when the second feature vector of the detection sample has a size of N, each vector may be expressed as one point in an N-dimension space, and the processor 110 may calculate the distribution of the detection sample in the latent space based on the point of the vector in the N-dimension space. Candidate labels to be allocated to the query sample may be constituted by labels corresponding to the detection sample, and the processor 110 grants a probability to each label corresponding to the detection sample to compute a probability distribution of the candidate labels to be allocated to the query sample. The processor 110 may compute the probability distribution of the candidate label to be allocated to the query sample based on Equation 6 below.

$$p(\hat{y}_q^{(i)}|x_q^{(i)}, G) = \mathrm{softmax}\left(\sum_{j=1}^{|G|} \langle q_i, g_j \rangle y_g^{(j)}\right) \quad \text{[Equation 6]}$$

$q_i$ represents the second feature vector of the i-th query sample. $g_j$ represents the second feature vector of the j-th detection sample. $\langle q_i, g_j \rangle$ represents an inner product between two second feature vectors. $y_g^{(j)}$ represents the label corresponding to the j-th detection sample. G represents the detection set, and |G| represents the size of the detection set, i.e., the number of elements of a detection sample set. $\hat{y}_a^{(i)}$ represents a prediction value of the label corresponding to the i-th query sample, and this may be calculated from an equation at a right side of Equation 6. p( ) represents a probability value. The processor 110 according to the present disclosure performs an operation of performing an inner product of the second feature vector for the i-th query sample and the second feature vector for the j-th detection sample, and then multiplying the vectors subjected to the inner product by the label corresponding to the j-th detection sample for an entire range (i.e., 1 to |G|) of j, and then aggregates a performing result and applies a softmax function to an aggregated value to compute the probability distribution of the candidate labels for the i-th query sample. The processor 110 may determine the label corresponding to the query sample by finding an element having a maximum value in the probability distribution of the candidate labels to be allocated to the query sample.

When the label corresponding to the query sample is determined according to the present disclosed contents to track an object in an image sequence, the processor 110 may track the object in real time. According to the present disclosed contents, the processor 110 may immediately determine a distribution of detection samples included in a second frame in the latent space, and then determine a label corresponding to a query sample included in a first frame based on labels of the detection samples. This has an effect in that an insufficient learning data problem may be solved, which is caused when an image is learned by using a traditional convolutional neural network (CNN), and even when the number of learning data is small, an image corresponding to a query sample which is effective and intuitive may be classified. According to the present disclosed contents, even when the number of learning data is small, the object may be tracked by effectively classifying an image sample. In the present disclosed contents, the label corresponding to the detection sample may be appreciated as a 'target label' of a kind of query sample. The method according to the present disclosed contents corresponds to the 'target label', and detection samples constituting one pair are effectively distributed in the latent space. In the method according to the present disclosed contents, a query sample for matching the target label is also mapped to the latent space based on the distribution of the detection sample to implement enhanced matching accuracy. Further, in the object tracking method according to the present disclosed contents, since the query sample and the detection sample match each other only in a relationship between the first frame and the second frame, a newly received detection result may be classified into an existing track set. In particular, in the tracking method according to the present disclosure, the label of the query sample may be predicted based on the label of the detection set. Accordingly, in the object tracking method according to the present disclosure, when the object is tracked, even though the number of objects to be tracked is not known in advance, the object may be tracked. This has an effect of being capable of effectively tracking the object in a flexible environment in which the number of objects to be tracked is changed in real time.

In an exemplary embodiment of the present disclosure, the processor 110 may end-to-end learn the neural network based models. The learning method of the neural network based model is described above with reference to FIG. 3, so a description which may be redundant is omitted. In an exemplary embodiment of the present disclosure, the query set may include a learning correct answer label for the query sample for end-to-end learning of the neural network based models. The learning correct answer label for the query sample may be generated based on a detection result of the detector for the first frame including the query sample. The processor 110 may simultaneously end-to-end learn a neural network based feature embedding model, a neural network based detection embedding model, and a neural network based query embedding model through backpropagation based on an error value between a prediction value (i.e., $\hat{y}_a^{(i)}$) of the label corresponding to the i-th query sample calculated as in Equation 6 and the learning correct answer label for the i-th query sample. The error value between the prediction value of the label and the learning correct answer label may be calculated by a Cross Entropy function. In another exemplary embodiment of the present disclosure, the detection set may include learning correct answer labels for a plurality of detection samples included in the second frame for end-to-end learning of the neural network based feature embedding model and the neural network based determination model. The learning correct answer label for the detection sample may represent an FP detection result of the detection sample. The processor 110 may learn both the neural network based determination model and the neural network based feature embedding model based on an error between the learning correct answer label for the detection sample and the detection reliability for the detection sample output by the neural network based determination model. Since the neural network based determination model uses the first feature vector for the detection sample calculated by the feature embedding model as an input, the detection sample corresponding to the input of the feature embedding model is set as learning input data, but when the detection reliability corresponding to an output of a determination model is learned as compared with the learning correct answer label for the detection sample, both the feature embedding model and the determination model may be learned.

Figure 5:
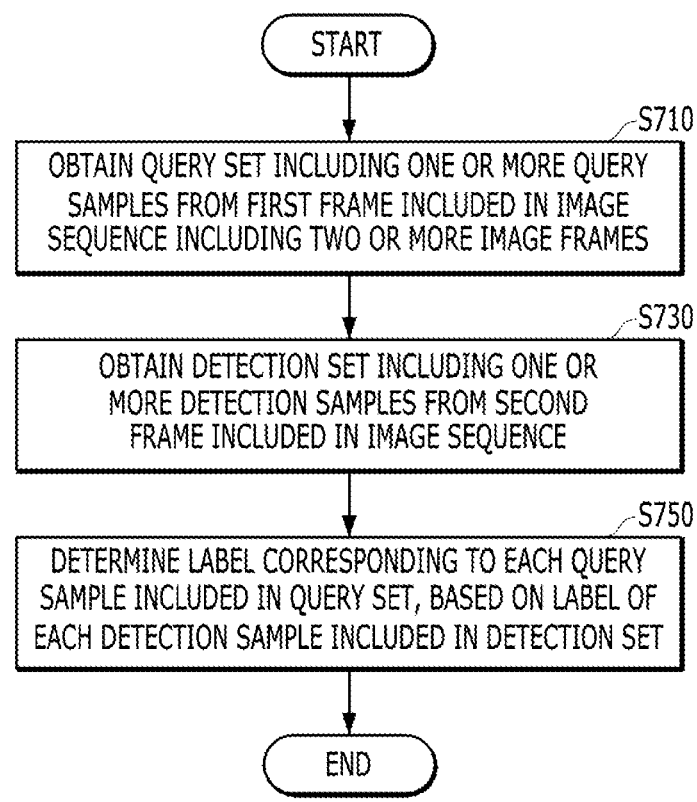
FIG. 5 is a flowchart for a process of tracking an object by a processor according to an exemplary embodiment of the present disclosure.

FIG. 5 is a flowchart for a process of tracking an object by a processor according to an exemplary embodiment of the present disclosure. In step S710, the processor 110 may obtain a query set including one or more query samples from a first frame included in an image sequence including two or more image frames. Information related to one or more query samples included in the first frame may be pre-stored in the memory 130. The information on the query sample may include, for example, track set information regarding one object included in the first frame, a bounding box coordinate of one object included in the first frame, image data of one object included in the first frame, etc. In step S730, the processor 110 may obtain a detection set including one or more detection samples from a second frame included in the image sequence. Detection sample related information may be obtained by a separate detector. The detection sample related information may include, for example, positional information of an object included in the second frame, the image data of the object, etc. In step S750, the processor 110 may determine a label corresponding to each query sample included in the query set based on a label of each detection sample included in the detection set. Step S750 will be described in detail with reference to FIG. 6.

Figure 6:
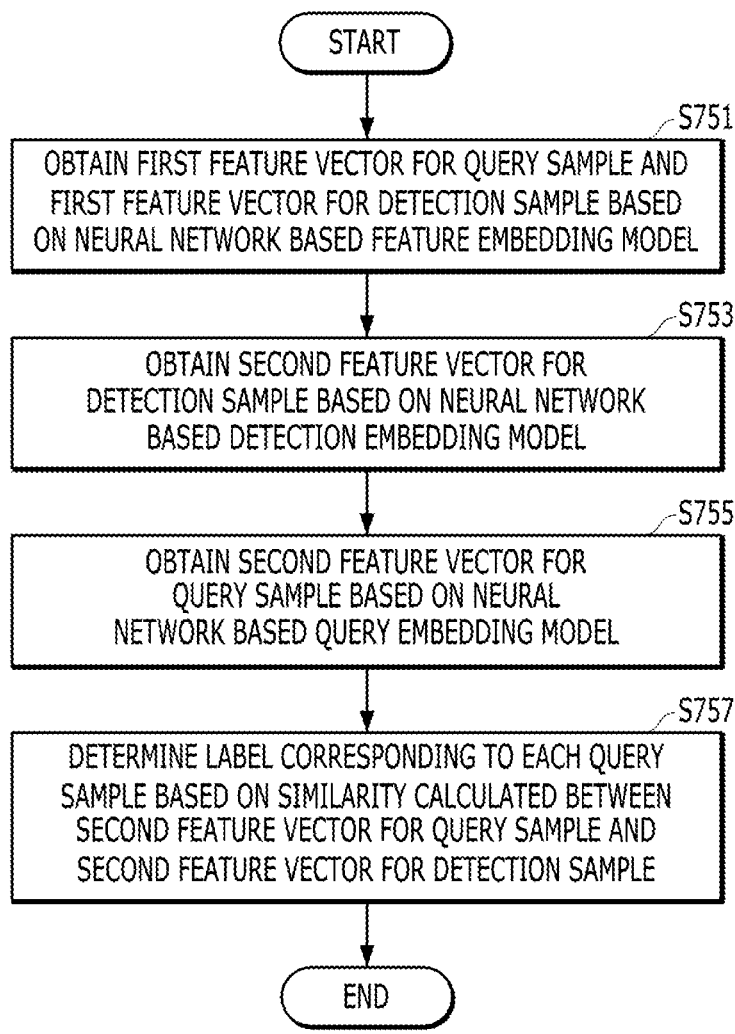
FIG. 6 is a flowchart for a process of determining a label corresponding to a query sample by a processor according to an exemplary embodiment of the present disclosure.

FIG. 6 is a flowchart for a process of determining a label corresponding to a query sample by a processor according to an exemplary embodiment of the present disclosure. In step S751, the processor 110 may obtain the first feature vector for the query sample and the first feature vector for the detection sample based on the neural network based feature embedding model. The feature embedding model may generate the first feature vector primarily mapping each of the query sample and the detection sample to the latent space. In step S753, the processor 110 may obtain the second feature vector for the detection sample based on the neural network based detection embedding model. The processor 110 may obtain 'the second feature vector for the detection sample' from 'the first feature vector for the detection sample' by using the detection embedding model. The detection embedding model according to the present disclosure may generate 'the second feature vector for the detection sample' so that each detection sample included in the detection set is mapped to the latent space by considering another detection sample. In step S755, the processor 110 may obtain the second feature vector for the query sample based on the neural network based query embedding model. The query embedding model may calculate 'the second feature vector for the query sample' by receiving 'the first feature vector for the query sample' and 'the second feature vector for the detection sample'. The query embedding model may calculate 'the second feature vector for the query sample' so that the query sample is mapped to the latent space by considering the relationship with the detection set. In step S757, the processor 110 may determine a label corresponding to each query sample based on a correlation calculated between the second feature vector for the query sample and the second feature vector for the detection sample. The processor 110 may perform an inner product of the second feature vector for the query sample and the second feature vector for the detection sample, and calculate the correlation based thereon. The processor 110 may compute a probability distribution of candidate labels to be allocated to the query sample by giving a high weight to a label of a detection sample in which a correlation value is calculated large. The processor 110 may determine the label corresponding to the query sample based on the computed probability distribution of the candidate labels.

Figure 7:
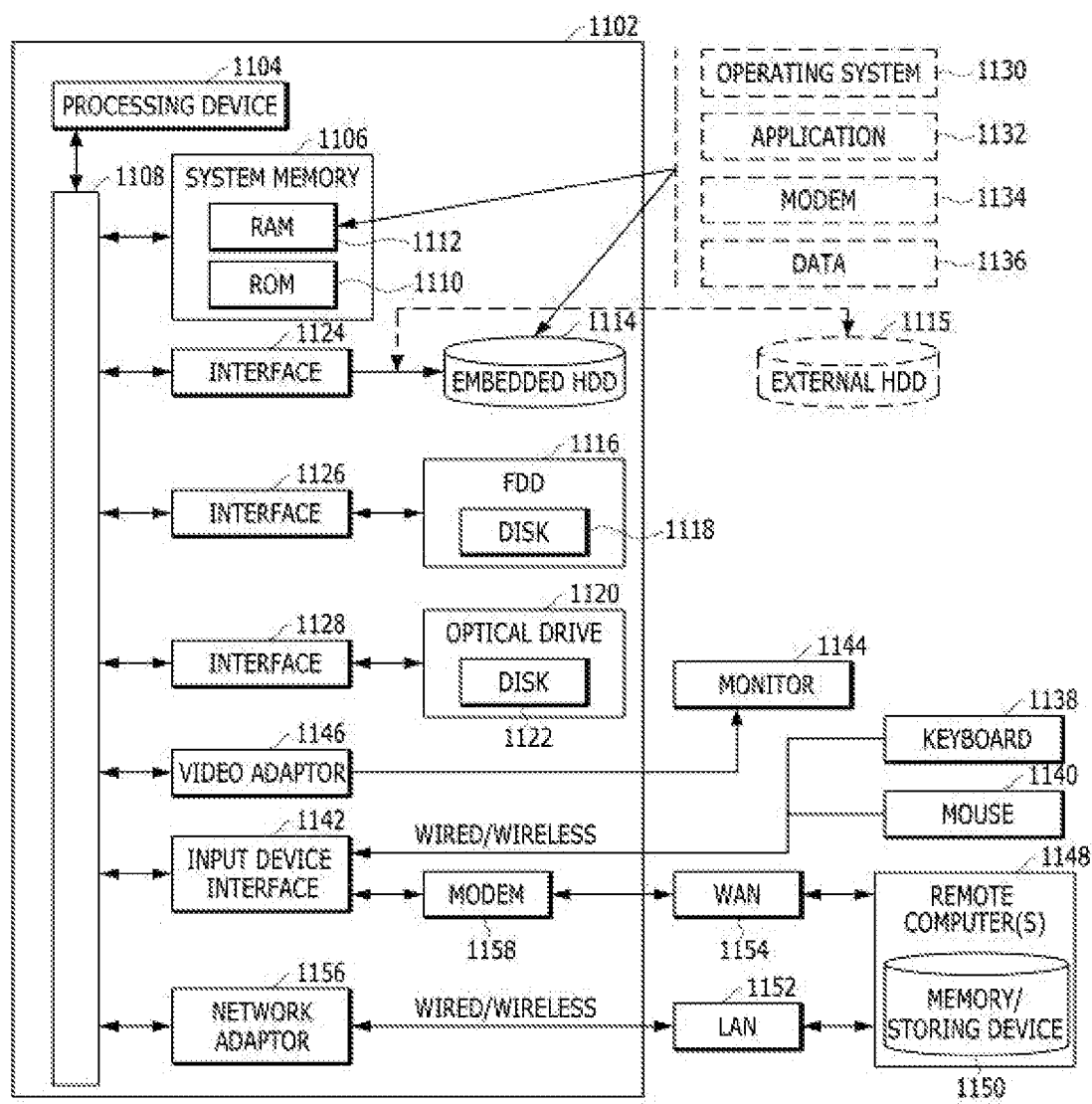
FIG. 7 is a simple and normal schematic view of an exemplary computing environment in which the exemplary embodiments of the present disclosure may be implemented.

FIG. 7 is a simple and normal schematic view of an exemplary computing environment in which the exemplary embodiments of the present disclosure may be implemented. It is described above that the present disclosure may be generally implemented by the computing device, but those skilled in the art will well know that the present disclosure may be implemented in association with a computer executable command which may be executed on one or more computers and/or in combination with other program modules and/or as a combination of hardware and software.

In general, the program module includes a routine, a program, a component, a data structure, and the like that execute a specific task or implement a specific abstract data type. Further, it will be well appreciated by those skilled in the art that the method of the present disclosure can be implemented by other computer system configurations including a personal computer, a handheld computing device, microprocessor-based or programmable home appliances, and others (the respective devices may operate in connection with one or more associated devices as well as a single-processor or multi-processor computer system, a mini computer, and a main frame computer.

The exemplary embodiments described in the present disclosure may also be implemented in a distributed computing environment in which predetermined tasks are performed by remote processing devices connected through a communication network. In the distributed computing environment, the program module may be positioned in both local and remote memory storage devices.

The computer generally includes various computer readable media. Media accessible by the computer may be computer readable media regardless of types thereof and the computer readable media include volatile and non-volatile media, transitory and non-transitory media, and mobile and non-mobile media. As a non-limiting example, the computer readable media may include both computer readable storage media and computer readable transmission media. The computer readable storage media include volatile and non-volatile media, transitory and non-transitory media, and mobile and non-mobile media implemented by a predetermined method or technology for storing information such as a computer readable instruction, a data structure, a program module, or other data. The computer readable storage media include a RAM, a ROM, an EEPROM, a flash memory or other memory technologies, a CD-ROM, a digital video disk (DVD) or other optical disk storage devices, a magnetic cassette, a magnetic tape, a magnetic disk storage device or other magnetic storage devices or predetermined other media which may be accessed by the computer or may be used to store desired information, but are not limited thereto.

The computer readable transmission media generally implement the computer readable command, the data structure, the program module, or other data in a carrier wave or a modulated data signal such as other transport mechanism and include all information transfer media. The term "modulated data signal" means a signal acquired by setting or changing at least one of characteristics of the signal so as to encode information in the signal. As a non-limiting example, the computer readable transmission media include wired media such as a wired network or a direct-wired connection and wireless media such as acoustic, RF, infrared and other wireless media. A combination of any media among the aforementioned media is also included in a range of the computer readable transmission media.

An exemplary environment 1100 that implements various aspects of the present disclosure including a computer 1102 is shown and the computer 1102 includes a processing device 1104, a system memory 1106, and a system bus 1108. The system bus 1108 connects system components including the system memory 1106 (not limited thereto) to the processing device 1104. The processing device 1104 may be a predetermined processor among various commercial processors. A dual processor and other multi-processor architectures may also be used as the processing device 1104.

The system bus 1108 may be any one of several types of bus structures which may be additionally interconnected to a local bus using any one of a memory bus, a peripheral device bus, and various commercial bus architectures. The system memory 1106 includes a read only memory (ROM) 1110 and a random access memory (RAM) 1112. A basic input/output system (BIOS) is stored in the non-volatile memories 1110 including the ROM, the EPROM, the EEPROM, and the like and the BIOS includes a basic routine that assists in transmitting information among components in the computer 1102 at a time such as in-starting. The RAM 1112 may also include a high-speed RAM including a static RAM for caching data, and the like.

The computer 1102 also includes an interior hard disk drive (HDD) 1114 (for example, EIDE and SATA), in which the interior hard disk drive 1114 may also be configured for an exterior purpose in an appropriate chassis (not illustrated), a magnetic floppy disk drive (FDD) 1116 (for example, for reading from or writing in a mobile diskette 1118), and an optical disk drive 1120 (for example, for reading a CD-ROM disk 1122 or reading from or writing in other high-capacity optical media such as the DVD, and the like). The hard disk drive 1114, the magnetic disk drive 1116, and the optical disk drive 1120 may be connected to the system bus 1108 by a hard disk drive interface 1124, a magnetic disk drive interface 1126, and an optical disk drive interface 1128, respectively. An interface 1124 for implementing an exterior drive includes at least one of a universal serial bus (USB) and an IEEE 1394 interface technology or both of them.

The drives and the computer readable media associated therewith provide non-volatile storage of the data, the data structure, the computer executable instruction, and others. In the case of the computer 1102, the drives and the media correspond to storing of predetermined data in an appropriate digital format. In the description of the computer readable media, the mobile optical media such as the HDD, the mobile magnetic disk, and the CD or the DVD are mentioned, but it will be well appreciated by those skilled in the art that other types of media readable by the computer such as a zip drive, a magnetic cassette, a flash memory card, a cartridge, and others may also be used in an exemplary operating environment and further, the predetermined media may include computer executable commands for executing the methods of the present disclosure.

Multiple program modules including an operating system 1130, one or more application programs 1132, other program module 1134, and program data 1136 may be stored in the drive and the RAM 1112. All or some of the operating system, the application, the module, and/or the data may also be cached in the RAM 1112. It will be well appreciated that the present disclosure may be implemented in operating systems which are commercially usable or a combination of the operating systems.

A user may input instructions and information in the computer 1102 through one or more wired/wireless input devices, for example, pointing devices such as a keyboard 1138 and a mouse 1140. Other input devices (not illustrated) may include a microphone, an IR remote controller, a joystick, a game pad, a stylus pen, a touch screen, and others. These and other input devices are often connected to the processing device 1104 through an input device interface 1142 connected to the system bus 1108, but may be connected by other interfaces including a parallel port, an IEEE 1394 serial port, a game port, a USB port, an IR interface, and others.

A monitor 1144 or other types of display devices are also connected to the system bus 1108 through interfaces such as a video adapter 1146, and the like. In addition to the monitor 1144, the computer generally includes other peripheral output devices (not illustrated) such as a speaker, a printer, others.

The computer 1102 may operate in a networked environment by using a logical connection to one or more remote computers including remote computer(s) 1148 through wired and/or wireless communication. The remote computer(s) 1148 may be a workstation, a computing device computer, a router, a personal computer, a portable computer, a micro-processor based entertainment apparatus, a peer device, or other general network nodes and generally includes multiple components or all of the components described with respect to the computer 1102, but only a memory storage device 1150 is illustrated for brief description. The illustrated logical connection includes a wired/wireless connection to a local area network (LAN) 1152 and/or a larger network, for example, a wide area network (WAN) 1154. The LAN and WAN networking environments are general environments in offices and companies and facilitate an enterprise-wide computer network such as Intranet, and all of them may be connected to a worldwide computer network, for example, the Internet.

When the computer 1102 is used in the LAN networking environment, the computer 1102 is connected to a local network 1152 through a wired and/or wireless communication network interface or an adapter 1156. The adapter 1156 may facilitate the wired or wireless communication to the LAN 1152 and the LAN 1152 also includes a wireless access point installed therein in order to communicate with the wireless adapter 1156. When the computer 1102 is used in the WAN networking environment, the computer 1102 may include a modem 1158 or has other means that configure communication through the WAN 1154 such as connection to a communication computing device on the WAN 1154 or connection through the Internet. The modem 1158 which may be an internal or external and wired or wireless device is connected to the system bus 1108 through the serial port interface 1142. In the networked environment, the program modules described with respect to the computer 1102 or some thereof may be stored in the remote memory/storage device 1150. It will be well known that an illustrated network connection is exemplary and other means configuring a communication link among computers may be used.

The computer 1102 performs an operation of communicating with predetermined wireless devices or entities which are disposed and operated by the wireless communication, for example, the printer, a scanner, a desktop and/or a portable computer, a portable data assistant (PDA), a communication satellite, predetermined equipment or place associated with a wireless detectable tag, and a telephone. This at least includes wireless fidelity (Wi-Fi) and Bluetooth wireless technology. Accordingly, communication may be a predefined structure like the network in the related art or just ad hoc communication between at least two devices.

The wireless fidelity (Wi-Fi) enables connection to the Internet, and the like without a wired cable. The Wi-Fi is a wireless technology such as the device, for example, a cellular phone which enables the computer to transmit and receive data indoors or outdoors, that is, anywhere in a communication range of a base station. The Wi-Fi network uses a wireless technology called IEEE 802.11(a, b, g, and others) in order to provide safe, reliable, and high-speed wireless connection. The Wi-Fi may be used to connect the computers to each other or the Internet and the wired network (using IEEE 802.3 or Ethernet). The Wi-Fi network may operate, for example, at a data rate of 11 Mbps (802.11a) or 54 Mbps (802.11b) in unlicensed 2.4 and 5 GHz wireless bands or operate in a product including both bands (dual bands).

It will be appreciated by those skilled in the art that information and signals may be expressed by using various different predetermined technologies and techniques. For example, data, instructions, commands, information, signals, bits, symbols, and chips which may be referred in the above description may be expressed by voltages, currents, electromagnetic waves, magnetic fields or particles, optical fields or particles, or predetermined combinations thereof.

It may be appreciated by those skilled in the art that various exemplary logical blocks, modules, processors, means, circuits, and algorithm steps described in association with the exemplary embodiments disclosed herein may be implemented by electronic hardware, various types of programs or design codes (for easy description, herein, designated as software), or a combination of all of them. In order to clearly describe the intercompatibility of the hardware and the software, various exemplary components, blocks, modules, circuits, and steps have been generally described above in association with functions thereof. Whether the functions are implemented as the hardware or software depends on design restrictions given to a specific application and an entire system. Those skilled in the art of the present disclosure may implement functions described by various methods with respect to each specific application, but it should not be interpreted that the implementation determination departs from the scope of the present disclosure.

Various embodiments presented herein may be implemented as manufactured articles using a method, a device, or a standard programming and/or engineering technique. The term manufactured article includes a computer program, a carrier, or a medium which is accessible by a predetermined computer-readable storage device. For example, a computer-readable storage medium includes a magnetic storage device (for example, a hard disk, a floppy disk, a magnetic strip, or the like), an optical disk (for example, a CD, a DVD, or the like), a smart card, and a flash memory device (for example, an EEPROM, a card, a stick, a key drive, or the like), but is not limited thereto. Further, various storage media presented herein include one or more devices and/or other machine-readable media for storing information.

It will be appreciated that a specific order or a hierarchical structure of steps in the presented processes is one example of exemplary accesses. It will be appreciated that the specific order or the hierarchical structure of the steps in the processes within the scope of the present disclosure may be rearranged based on design priorities. Appended method claims provide elements of various steps in a sample order, but the method claims are not limited to the presented specific order or hierarchical structure.

The description of the presented exemplary embodiments is provided so that those skilled in the art of the present disclosure use or implement the present disclosure. Various modifications of the exemplary embodiments will be apparent to those skilled in the art and general principles defined herein can be applied to other exemplary embodiments without departing from the scope of the present disclosure. Therefore, the present disclosure is not limited to the exemplary embodiments presented herein, but should be interpreted within the widest range which is coherent with the principles and new features presented herein.

What is claimed is:

1. A method for tracking an object, which is performed by a computing device including at least one processor, the method comprising:
    obtaining a query set including one or more query samples from a first frame included in an image sequence including two or more image frames;
    obtaining a detection set including one or more detection samples from a second frame included in the image sequence; and
    determining a label corresponding to each query sample included in the query set, based on a feature vector for a detection sample of the one or more detection samples mapped to a latent space by considering a relationship between the detection samples included in the detection set, wherein the label comprises a vector;
    wherein the determining of the label includes,
        calculating a correlation between a query feature vector for the query sample and a detection feature vector for the detection sample, and
        determining the label based on the calculated correlation.

2. The method of claim 1, wherein the determining of the label includes,
    computing a probability distribution of candidate labels to be allocated to the query sample based on a distribution of the respective detection samples included in the detection set in the latent space, and
    determining the label based on the computed probability distribution, wherein the label is based on a sample having a maximum value in the computed probability distribution.

3. The method of claim 1, further comprising:
    obtaining a first feature vector for a query sample by inputting the query sample into a neural network based feature embedding model; or
    obtaining a first feature vector for the detection sample by inputting the detection sample into the feature embedding model.

4. The method of claim 1, further comprising:
obtaining a second feature vector for the detection sample based on a neural network based detection embedding model.

5. The method of claim 4, wherein the detection embedding model includes at least one bidirectional long short-term memory (LSTM) cell, and
wherein the step of obtaining the second feature vector for the detection sample is further based on
a first feature vector for the detection sample, and
an output vector of the bidirectional LSTM cell for at least one detection sample different from the detection sample, and
the first feature vector and the second feature vector are different from each other.

6. The method of claim 1, further comprising:
obtaining a second feature vector for the query sample based on a neural network based query embedding model.

7. The method of claim 6, further comprising:
generating input data for the query embedding model based on output data for the query sample of the neural network based feature embedding model and output data for the detection sample of the neural network based detection embedding model.

8. The method of claim 6, wherein the step of obtaining of the second feature vector for the query sample is further based on
a first feature vector for the query sample, and
a weighted average vector calculated based on at least one detection sample, and
the first feature vector and the second feature vector are different from each other.

9. The method of claim 8, wherein the obtaining of the second feature vector for the query sample includes
sequentially concatenating the first feature vector for the query sample and the weighted average vector, and
inputting the both vectors sequentially concatenated into a fully connected network function included in the query embedding model.

10. The method of claim 8, wherein the weighted average vector is calculated as a result of computing a correlation between the first feature vector for the query sample and the second feature vector for at least one detection sample included in the detection set.

11. The method of claim 1, further comprising:
computing a detection reliability value for each of one or more detection samples included in the detection set by inputting a vector expression for the second frame into a determination model and obtaining a classification result, wherein the classification result comprises a scalar value representing the detection reliability value.

12. The method of claim 11, wherein the computing of the detection reliability value is performed based on a neural network based determination model receiving the first feature vector for the detection sample, and then outputting the detection reliability.

13. The method of claim 1, further comprising:
obtaining the first feature vector for the query sample and the first feature vector for the detection sample based on a neural network based feature embedding model;
obtaining the second feature vector for the detection sample based on a neural network based detection embedding model;
obtaining the second feature vector for the query sample based on a neural network based query embedding model; and
computing the detection reliability value for the detection sample based on a neural network based determination model by inputting a vector expression for the second frame into a determination model and obtaining a classification result, wherein the classification result comprises a scalar value representing the detection reliability value.

14. The method of claim 13, wherein the determining of the label is performed based on a similarity calculated between the second feature vector for the query sample and the second feature vector for the detection sample.

15. A non-transitory computer-readable storage medium storing a computer program, wherein the computer program executes operations of tracking an object when the computer program is executed by one or more processors, the operations comprising:
obtaining a query set including one or more query samples from a first frame included in an image sequence including two or more image frames;
obtaining a detection set including one or more detection samples from a second frame included in the image sequence; and
determining a label corresponding to each query sample included in the query set, based on a feature vector for a detection sample of the one or more detection samples mapped to a latent space by considering a relationship between detection samples included in the detection set, wherein the label comprises a vector;
wherein the determining of the label includes,
calculating a correlation between a query feature vector for the query sample and a detection feature vector for the detection sample, and
determining the label based on the calculated correlation.

16. An apparatus for tracking an object, the apparatus comprising:
one or more processors;
one or more memories; and
a network unit,
wherein the one or more processors are configured to
obtain a query set including one or more query samples from a first frame included in an image sequence including two or more image frames,
obtain a detection set including one or more detection samples from a second frame included in the image sequence, and
determine a label corresponding to each query sample included in the query set, based on a feature vector for a detection sample of the one or more detection samples mapped to a latent space by considering a relationship between detection samples included in the detection set, wherein the label comprises a vector;
wherein determining the label includes,
calculating a correlation between a query feature vector for the query sample and a detection feature vector for the detection sample, and
determining the label based on the calculated correlation.

* * * * *